(12) United States Patent
Onoda

(10) Patent No.: US 9,172,878 B2
(45) Date of Patent: Oct. 27, 2015

(54) IMAGE CAPTURING APPARATUS, IMAGE CAPTURING CONTROL METHOD AND STORAGE MEDIUM FOR CAPTURING A SUBJECT TO BE RECORDED WITH INTENDED TIMING

(75) Inventor: Takashi Onoda, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 13/337,922

(22) Filed: Dec. 27, 2011

(65) Prior Publication Data
US 2012/0162476 A1 Jun. 28, 2012

(30) Foreign Application Priority Data
Dec. 28, 2010 (JP) ................................. 2010-293007

(51) Int. Cl.
*H04N 5/232* (2006.01)

(52) U.S. Cl.
CPC ................................ *H04N 5/23293* (2013.01)

(58) Field of Classification Search
CPC .......... H04N 5/23293; H04N 5/23216; H04N 5/23219; H04N 2201/3273; H04N 5/225; H04N 5/232; H04N 1/0044; H04N 1/32144; H04N 2201/0084
See application file for complete search history.

(56) References Cited

U.S. PATENT DOCUMENTS

| 5,594,469 | A | * | 1/1997 | Freeman et al. | 345/158 |
| 5,936,610 | A | * | 8/1999 | Endo | 345/157 |
| 6,160,899 | A | * | 12/2000 | Lee et al. | 382/103 |
| 6,771,277 | B2 | * | 8/2004 | Ohba | 345/629 |
| 7,561,201 | B2 | * | 7/2009 | Hong | 348/333.01 |
| 7,886,229 | B2 | * | 2/2011 | Pachet | 715/726 |
| 2007/0013718 | A1 | * | 1/2007 | Ohba | 345/629 |

(Continued)

FOREIGN PATENT DOCUMENTS

| JP | 2005-192015 A | 7/2005 |
| JP | 2006-235771 A | 9/2006 |
| JP | 2007074296 A | 3/2007 |
| JP | 2010-181968 A | 8/2010 |

OTHER PUBLICATIONS

Nikon Coolpix L11 press release Feb. 20, 2007 and user manual pp. 6,7,26,48.*

(Continued)

*Primary Examiner* — Twyler Haskins
*Assistant Examiner* — Angel L Garces-Rivera
(74) *Attorney, Agent, or Firm* — Holtz, Holtz, Goodman & Chick PC

(57) ABSTRACT

An image capturing apparatus (1) includes an image capturing unit (2), a display control unit (71), an overlap determination unit (72), and a recording control unit (74). The image capturing unit (22) sequentially captures an image of a subject. The display control unit (71) controls the image containing the subject image sequentially captured by the image capturing unit (22) and an indicator image for instructing recording of the subject image to be displayed on a display unit in such a way that the indicator image is superimposed on the image containing the subject image. The overlap determination unit (72) determines whether the indicator image and the subject image have overlapped. The recording control unit (74) controls the image containing the subject image to be recorded in a storage medium, when the overlap determination unit (72) determines that the indicator image and the subject image have overlapped.

8 Claims, 6 Drawing Sheets

(56) References Cited

U.S. PATENT DOCUMENTS

| | | | |
|---|---|---|---|
| 2008/0062127 A1* | 3/2008 | Brodersen et al. | 345/158 |
| 2008/0079824 A1* | 4/2008 | Sawachi | 348/240.1 |
| 2008/0220809 A1* | 9/2008 | Hansen | 455/550.1 |
| 2009/0153474 A1* | 6/2009 | Quennesson | 345/157 |
| 2009/0303352 A1* | 12/2009 | Fujinawa | 348/231.99 |
| 2010/0013943 A1* | 1/2010 | Thorn | 348/222.1 |
| 2010/0027843 A1* | 2/2010 | Wilson | 382/103 |
| 2012/0014684 A1* | 1/2012 | D'Souza et al. | 396/263 |

OTHER PUBLICATIONS

Japanese Office Action dated Nov. 27, 2012 (and English translation thereof) in counterpart Japanese Application No. 2010-293007.

Chinese Office Action dated Jan. 6, 2014 (and English translation thereof) in counterpart Chinese Application No. 201110433330.6.

Japanese Office Action dated Nov. 11, 2014, issued in counterpart Japanese Application No. 2013-011621.

* cited by examiner

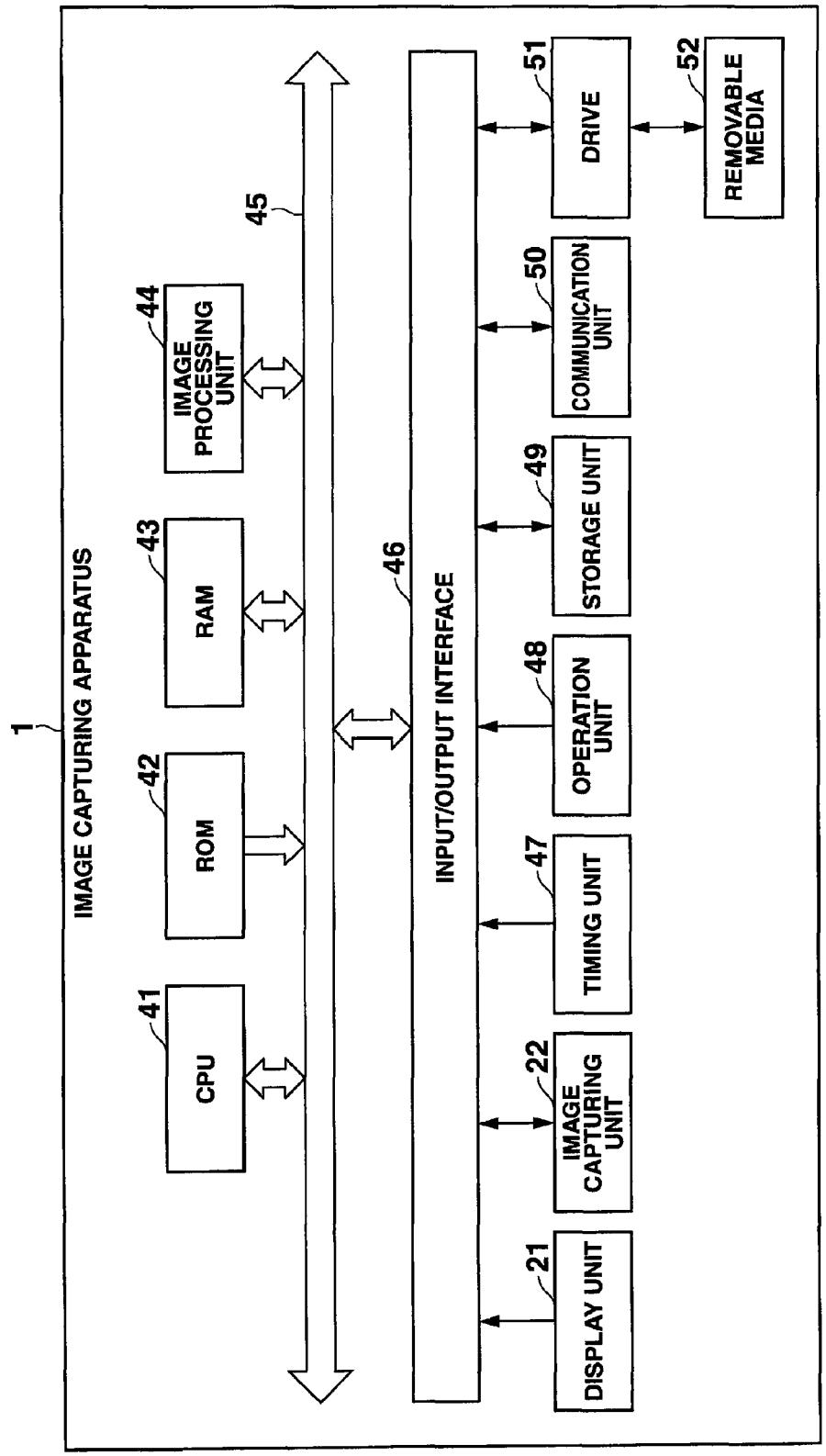

IMAGE CAPTURING APPARATUS, IMAGE CAPTURING CONTROL METHOD AND STORAGE MEDIUM FOR CAPTURING A SUBJECT TO BE RECORDED WITH INTENDED TIMING

This application is based on and claims the benefit of priority from Japanese Patent Application No. 2010-293007, filed on 28 Dec. 2010, the content of which is incorporated herein by reference.

BACKGROUND OF THE INVENTION

1. Field of the Invention

The present invention relates to an image capturing apparatus, an image capturing control method and a storage medium for capturing a subject to be recorded with intended timing.

2. Related Art

Conventionally, when a user photographs himself/herself using an image capturing apparatus such as a digital camera, the user can instruct the shutter timing (the timing of capturing an image for recording) by remote operation, without directly pressing down a shutter button.

For example, Japanese Unexamined Patent Application, Publication No. 2005-192015 discloses a technology in which, using a remote control equipped with an LED (Light Emitting Diode), a digital camera captures an image of a subject when light from the LED in this remote control is received by this digital camera.

SUMMARY OF THE INVENTION

The present invention has an object of capturing a subject to be recorded at an intended timing, without any dedicated apparatus for instructing shutter timing such as a remote control.

In order to achieve the above-mentioned object, according to a first aspect of the present invention, an image capturing apparatus includes:

an image capturing unit that sequentially captures a subject;

a display control unit that controls the image containing the subject image sequentially captured by the image capturing unit and an indicator image for instructing recording of the subject image to be displayed on a display unit in such a way that the indicator image is superimposed on the image containing the subject image;

an overlap determination unit that determines whether the indicator image and the subject image have overlapped; and a recording control unit that controls the image containing the subject image to be recorded in a storage medium, when the overlap determination unit determines that the indicator image and the subject image have overlapped.

Furthermore, in order to achieve the above-mentioned object, according to a second aspect of the invention, an image capturing control method executed by an image capturing apparatus having an image capturing unit that sequentially captures a subject, includes:

a display control step of controlling the image containing the subject image sequentially captured by the image capturing unit and an indicator image for instructing recording of the subject image to be displayed in a display unit in such a way that the indicator image is superimposed on the image containing the subject image;

an overlap determination step of determining whether the indicator image and the subject image have overlapped; and a recording control step of controlling an image containing the subject image to be recorded in a storage medium, when it is determined in the overlap determination step that the indicator image and the subject image have overlapped.

Furthermore, in order to achieve the above-mentioned object, according to a third aspect of the invention, a computer readable storage medium has stored therein a program causing a computer of an electronic apparatus provided with an image capturing unit that sequentially captures an image of a subject and a storage medium to function as:

a display control unit that controls the subject image sequentially captured by the image capturing unit and an indicator image for instructing recording of the subject image to be displayed on a display unit in such a way that the indicator image is superimposed on the image containing the subject image;

an overlap determination unit that determines whether the indicator image and the subject image have overlapped; and a recording control unit that controls the image containing the subject image to be recorded in a storage medium, when the overlap determination unit determines that the indicator image and the subject image have overlapped.

BRIEF DESCRIPTION OF THE DRAWINGS

FIG. 2 is a perspective view showing the exterior configuration of the image capturing apparatus set standing on a desk or the like;

FIG. 4 is a block diagram showing a configuration of hardware of an image capturing apparatus capable of executing image capture processing through a remote image capturing signal;

DETAILED DESCRIPTION OF THE INVENTION

In the following, an embodiment of the present invention will be explained with reference to the drawings.

FIG. 1 is a plan view showing an exterior configuration of an image capturing apparatus according to one embodiment of the present invention.

Figure 1A:
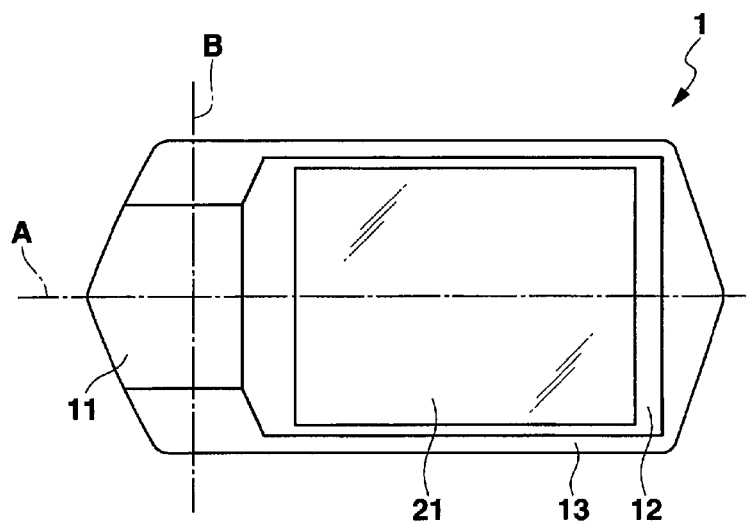
FIG. 1 is a plan view showing an exterior configuration of an image capturing apparatus according to one embodiment of the present invention.

More specifically, FIG. 1A is a plan view showing the exterior configuration of the image capturing apparatus when an imaging surface and a display surface are respectively arranged on opposing sides.

Figure 1B:
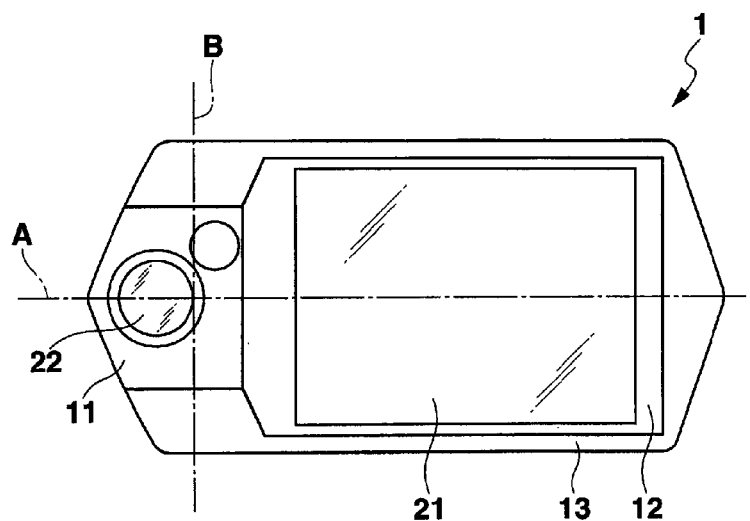

FIG. 1B is a plan view showing the exterior configuration of the image capturing apparatus when the imaging surface and the display surface are arranged on the same side.

The image capturing apparatus 1 is configured by a digital camera, for example, and can sequentially photograph a subject and display an image in which an indicator indicative of an instruction for the shutter timing (instruction for recording) is superimposed on the image containing the subject acquired in each image capturing (hereinafter, referred to as "indicator-superimposed image").

In this case, the user can instruct the shutter timing, while viewing the indicator-superimposed image, by making a predetermined movement with their hand at a timing intended by the user to superimpose an image of the hand in the indicator-superimposed image over the indicator.

It should be noted that, hereinafter, a movement with a hand is referred to as a "hand gesture", and manipulation of an image capturing apparatus 1 by way of a hand gesture is referred to as "hand gesture operation".

Thus, the image capturing apparatus 1 can execute a processing sequence from capturing an image of the user based on the hand gesture operation for instructing any shutter timing intended by the user, until recording the data of the resultant image (hereinafter referred to as "data of a captured image").

Since the hand gesture operation for instructing the shutter timing intended by the user is a remote image capturing signal, such a processing sequence is hereinafter referred to as an "image capture processing through a remote image capturing signal".

The image capturing apparatus 1 includes a camera main body 11, a display unit main body 12 and a frame main body 13 to execute the image capture processing through remote image capturing signal.

The camera main body 11 is formed in a short columnar shape with a pentagonal horizontal cross-section, the back side of the camera main body 11 is formed to be level, as shown in FIG. 1A, and the imaging surface of an image capturing unit 22 (surface on an imaging lens side thereof) is arranged on the surface of the camera main body 11, as shown in FIG. 1B. This means that the camera main body 11 is a first housing which accommodates the image capturing unit 22.

The camera main body 11 is pivotally supported to the display unit main body 12 to be able to rotate about a rotation axis A penetrating through the camera main body 11 and therethrough.

Furthermore, the camera main body 11 is pivotally supported to the frame main body 13 to be able to rotate about a rotation axis B extending perpendicularly to a rotation axis A and through the camera main body 11.

More specifically, the camera main body 11 is configured to be able to rotate about the rotation axis A, with the display unit main body 12 slidingly contacting with a side of the pentagonal shape of the camera main body 11.

It should be noted that, hereinafter, a "camera side" refers to the side of the image capturing apparatus 1 on which the camera main body 11 is installed (the left side in FIG. 1) and a " display unit side" refers to the side on which the display unit main body 12 is installed (right side in FIG. 1, i.e. side opposite to the side facing the camera main body 11, in particular).

The display unit main body 12 is formed in a substantially rectangular shape in a horizontal cross-section, and a rectangular display surface of a display unit 21 is positioned at the center of the surface of the display unit main body 12. This means that the display unit main body 12 is a second housing that accommodates the display unit 21.

The frame main body 13 is formed in a shape having a substantially U-shape in a horizontal cross-section with a base and two parallel arms, each of which extends from the respective ends of the base substantially perpendicularly to the base.

The base of the frame main body 13 is formed to project in a V configuration in a direction opposite to the direction in which two parallel arms of the frame main body 13 extend (i.e. display unit side).

The frame main body 13 is connected to the camera main body 11, i.e. the first housing, so as to be able to rotate about the rotation axis B. In other words, the camera main body 11 is pivotally supported to be able to rotate about the rotation axis B, which extends between the leading ends of the two arms of the frame main body 13.

Therefore, the camera main body 11 is pivotally supported to the frame main body 13 in a state in which two sides opposing each other in the pentagonal shape of the camera main body 11 are in contact with the two arms of the frame main body 13. This makes it possible for the camera main body 11 to rotate while the opposing two sides slidingly contact the two arms of the frame main body 13, respectively.

Thus, since the camera main body 11 is pivotally supported to the frame main body 13 to be rotatable, the orientation of the surface on which imaging surface of the image capturing unit 22 is disposed can be freely changed. This means that, by rotating the camera main body 11, the user can direct the imaging surface of the image capturing unit 22 to a far side into the drawing relative to the plane on which the image capturing apparatus 1 is illustrated, as shown in FIG. 1A, and can direct the imaging surface of the image capturing unit 22 to a near side out of the drawing, as shown in FIG. 1B.

Consequently, if the subject is present on this far side, the user can have the image capturing unit 22 capture an image of the subject at this far side, by rotating the camera main body 11 about the rotation axis B to enter the state shown in FIG. 1A.

On the other hand, if the subject is present on the near side such as in a case of the user photographing himself/herself as the subject, the user can have the image capturing unit 22 capture an image of the subject on the near side, by rotating the camera main body 11 about the rotation axis B to enter the state shown in FIG. 1B.

Figure 2:
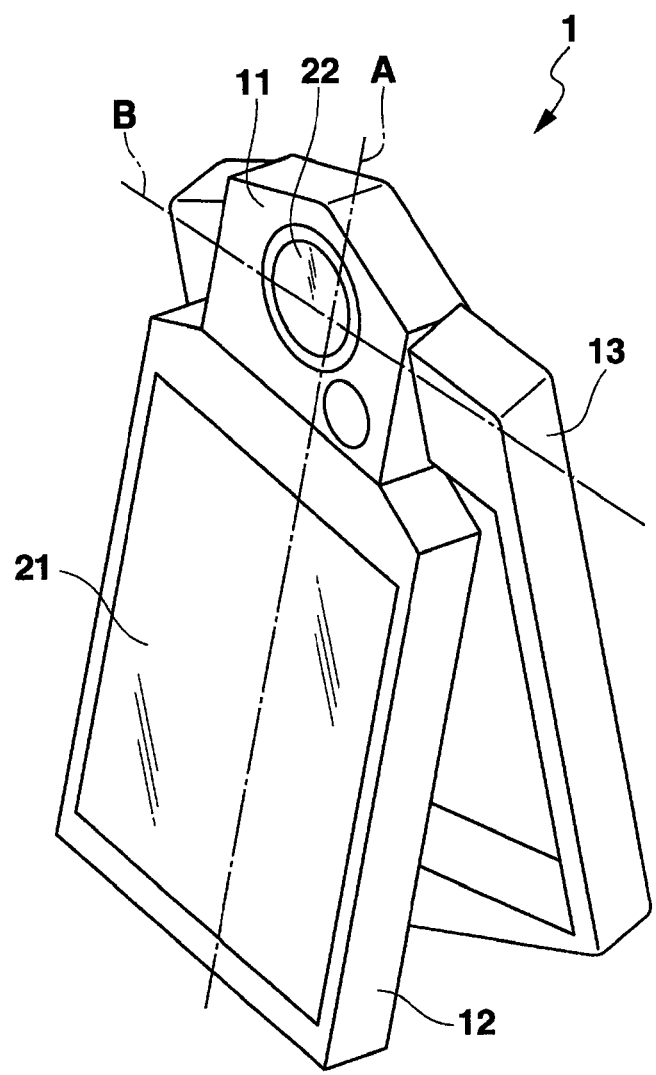

FIG. 2 is a perspective view showing the exterior configuration of the image capturing apparatus 1 set standing on a desk or the like.

For example, when the user photographs himself/herself, the user first sets the image capturing apparatus 1 to stand on a desk or the like, in a state in which normal lines to the display surface of the display unit 21 and to the imaging surface of the image capturing unit 22 are each substantially the same direction to each other, and the camera main body 11 and the frame main body 13 have been rearranged so as to form a predetermined angle relative to each other, as shown in FIG. 2.

This means that the leading end of the projecting V-shaped base constituting the frame main body 13 and the edge of the display unit main body 12 function as a pedestal and abut with the surface of a desk or the like, and both the frame main body 13 and the display unit main body 12 are pivotally supported to each other via the rotation axis B, whereby the image capturing apparatus 1 can be set to stand on the desk or the like.

FIG. 3 shows one example of an image displayed on the image capturing apparatus 1 shown in FIG. 1.

Figure 3A:
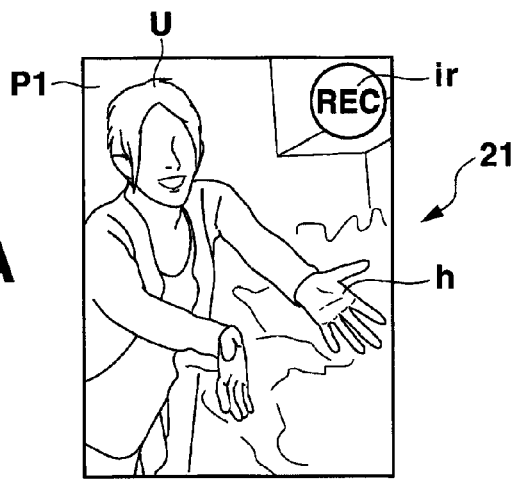
FIG. 3 shows an example of an image displayed on the image capturing apparatus 1 of FIG. 1.

FIG. 3A shows one example of an indicator-superimposed image which is displayed in a preliminary stage in a case of the user photographing himself/herself as the subject.

Figure 3B:
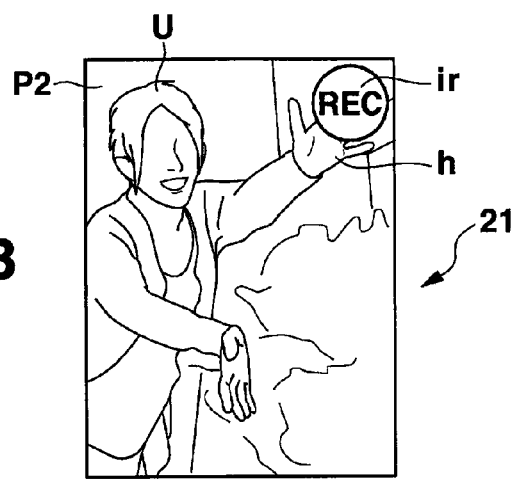

FIG. 3B shows one example of an indicator-superimposed image which is displayed when the user instructs shutter timing.

Figure 3C:
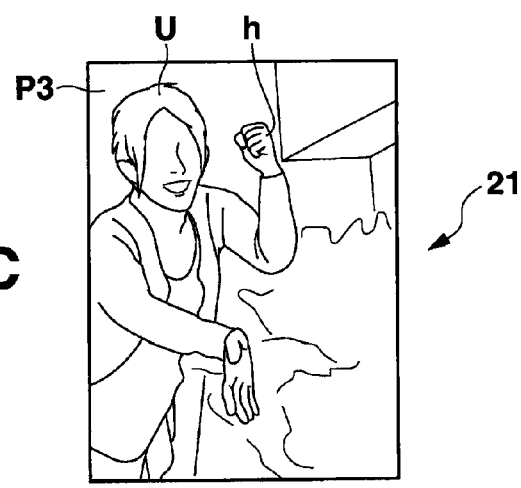

FIG. 3C shows one example of a captured image which is displayed when an image for recording is captured.

More specifically, in a case of the user photographing himself/herself as the subject, after the user sets the image capturing apparatus 1 to stand on a desk or the like, as shown in FIG. 2, the user moves to a position a certain distance away from the image capturing unit 22 (position from which the display of the display unit 21 can be seen), so as to be facing the imaging surface of the image capturing unit 22.

Then, an indicator-superimposed image P1 such as that shown in FIG. 3A is captured, and the indicator-superimposed image P1 is displayed on the display unit 21 as a mirror image in relation to the user. This means that, as shown in FIG. 3A, in the indicator-superimposed image P1, an icon image ir, which is the indicator for instructing the shutter timing, is superimposed on the upper-right part of the captured image containing the image containing a user image U (live-view image, which will be described later). However, in the indicator-superimposed image P1, a hand image h in the user image U does not overlap the icon image ir.

It should be noted that the display unit 21 may display the indicator-superimposed image P1 as an erect image in relation to the user, instead of displaying it as a mirror image in relation to the user.

Thereafter, the user adjusts the shutter timing, while viewing another indicator-superimposed image (not illustrated). Herein, the reason for mentioning another indicator-superimposed image is that the other indicator-superimposed image differs from the indicator-superimposed image P1 of FIG. 3A in that the former contains the icon image ir superimposed on the live-view image (described below) acquired as a result of the sequential image capturing of the user.

Then, the user causes the hand image h to be superimposed on the icon image ir at that position (at some point distant from the image capturing apparatus 1), by making a hand gesture operation of hiding the hand or shaking the hand at the desired timing. This means that at this moment, the display unit 21 displays the indicator-superimposed image P2 in which the hand image h in the user image U overlaps the icon image ir, as shown in FIG. 3B.

The image capturing apparatus 1 recognizes that the instruction for the shutter timing, i.e. the instruction for capturing an image for recording, by recognizing that the hand image h in the user image U has overlapped the icon image ir.

It should be noted that the image capturing apparatus 1 may record the data of an image captured at the moment when the image capturing apparatus 1 recognizes that the hand image h in the user image U has overlapped the icon image ir; however, the captured image at this moment is the indicator-superimposed image P2 of FIG. 3B lacking the icon image ir, i.e. an image containing the hand image h captured at the moment when the hand gesture operation was being made. In most cases, the user would consider such a captured image not suitable for recording. In other words, most users would want to save the data of an image captured after making the hand gesture operation and assuming a pose, as the image for recording.

Therefore, in the present embodiment, the image capturing apparatus 1 executes an image capturing operation for recording, assuming that the overlap of the hand image h in the user image U onto the icon image ir indicates activating a so-called self-timer.

This means that the image capturing apparatus 1 starts a countdown. During the countdown, the progress of the countdown is notified to the user by way of displaying a counter for the countdown (not illustrated) on the display unit 21 or blinking a predetermined illuminated part, thereby allowing the user to make preparations such as pose.

When the countdown has completed, a shutter of the image capturing apparatus 1 is clicked. This means that the image capturing apparatus 1 records, as image data for recording, the data of the image captured by the image capturing unit 22 at the moment when the countdown ends.

In this example, at the moment when the countdown ends and the shutter is clicked, the image P3 shown in FIG. 3C, i.e. the image P3 photographed so that the user image U having decided a pose, with the hand image h not overlapping the area of the icon image ir, is a mirror image, is displayed on the display unit 21, and simultaneously, the data of a captured image corresponding to the image P3 is recorded as an image data to be recorded.

In the present embodiment, the image capture processing through remote image capturing signal is executed by the image capturing apparatus 1 in the above-described manner.

FIG. 4 is a block diagram showing the hardware configuration of the image capturing apparatus 1, which is capable of executing the above image capture processing through remote image capturing signal.

In addition to the display unit 21 and the image capturing unit 22 as described above, the image capturing apparatus 1 is further provided with a CPU (Central Processing Unit) 41, ROM (Read Only Memory) 42, RAM (Random Access Memory) 43, an image processing unit 44, a bus 45, an input/output interface 46, a timing unit 47, an operation unit 48, a storage unit 49, a communication unit 50, and a drive 51.

The CPU 41 executes various types of processing according to programs that are recorded in the ROM 42 or programs that are loaded from the storage unit 49 to the RAM 43.

The RAM 43 also stores data and the like necessary for the CPU 41 to execute the various processes, as appropriate.

The image processing unit 44 is configured by a DSP (Digital Signal Processor), VRAM (Video Random Access Memory), and the like, and collaborates with the CPU 41 to execute various kinds of image processing on image data.

For example, the image processing unit 44 executes image processing such as noise reduction, white balance adjustment, blur correction on the data of a captured image outputted from the image capturing unit 22.

The CPU 41, the ROM 42, the RAM 43, and the image processing unit 44 are connected to one another via the bus 45. The bus 45 is also connected with the input/output interface 46. The input/output interface 46 is connected to the display unit 21, the image capturing unit 22, the timing unit 47, the operation unit 48, the storage unit 49, the communication unit 50, and the drive 51.

The display unit 21 is configured by a display capable of displaying various images such as the indicator-superimposed image, and the like.

The image capturing unit 22 is provided with an optical lens unit and an image sensor, which are not illustrated.

In order to photograph a subject, the optical lens unit is configured by a lens, e.g., a focus lens, that condenses light, a zoom lens and the like.

The focus lens is a lens for forming an image of a subject on the light receiving surface of the image sensor. The zoom lens is a lens for freely changing a focal length within a predetermined range.

The optical lens unit also includes peripheral circuits to adjust parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e.

captures) the image of the subject, accumulates the resultant image signal for a predetermined time interval, and sequentially supplies the image signal as an analog signal to the AFE.

The AFE executes various kinds of signal processing such as A/D (Analog/Digital) conversion processing of the analog signal, and outputs the resultant digital signal as an output signal from the image capturing unit 22. The various kinds of signal processing generate a digital signal, which is output as an output signal from the image capturing unit 22.

Such an output signal from the image capturing unit 22 is data of a captured image, and provided as appropriate to the CPU 41, the image processing unit 44, and the like.

The timing unit 47 executes time measurement under the control of the CPU 41.

The operation unit 48 is configured by various buttons such as the shutter button (not illustrated), and accepts instruction operations from a user.

The storage unit 49 is configured by DRAM (Dynamic Random Access Memory) or the like, and stores data of various images such as a live-view image, which will be described later.

The communication unit 50 controls communication with other devices via a network, which includes the Internet.

Removable media 52 made from a magnetic disk, an optical disk, a magneto-optical disk, semiconductor memory, or the like is installed in the drive 51, as appropriate. Programs read via the drive 51 from the removable media 52 are installed in the storage unit 49 as necessary. In addition, similarly to the storage unit 49, the removable media 52 can also store various kinds of data such as the image data stored in the storage unit 49.

Figure 5:
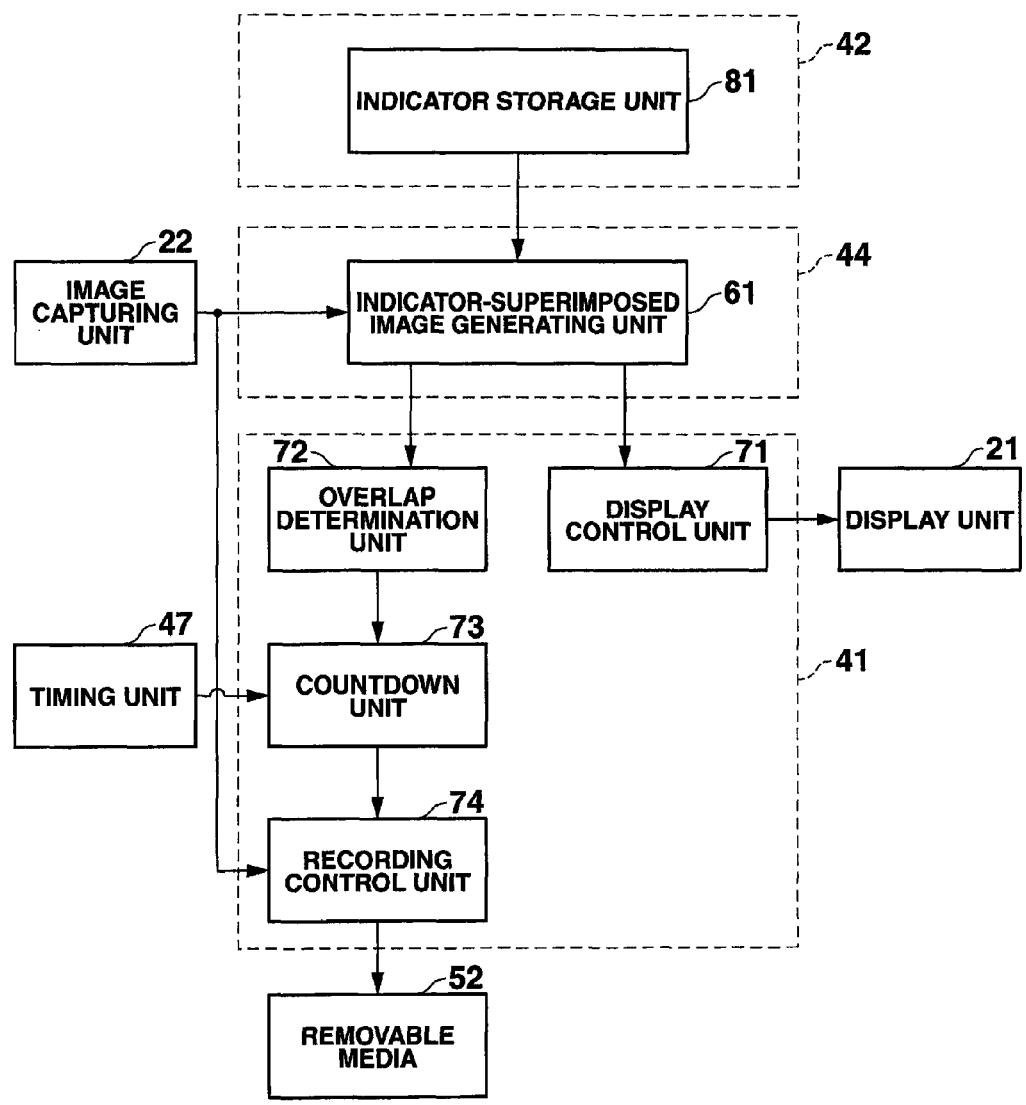
FIG. 5 is a functional block diagram showing a functional configuration for realizing an executive function of image capture processing through a remote image capturing signal, among the functions possessed by the image capturing apparatus having the hardware configuration of FIG. 4.

FIG. 5 is a functional block diagram showing a functional configuration for realizing an executive function of image capture processing through a remote image capturing signal, among the functions possessed by the image capturing apparatus 1 having the above-mentioned hardware configuration.

When the image capture processing through remote image capturing signal is executed, an indicator-superimposed image generating unit 61 functions in the image processing unit 44, while a display control unit 71, an overlap determination unit 72, a countdown unit 73, and a recording control unit 74 function in the CPU 41.

A region of the ROM 42 is provided with an indicator storage unit 81 that stores image data of the indicator such as the icon image it (FIG. 3).

The indicator-superimposed image generating unit 61 sequentially generates data of an indicator image by superimposing the image data of the indicator read from the indicator storage unit 81 onto the data of a captured image sequentially supplied by the image capturing unit 22, and supplies the data of the indicator image to the display control unit 71 and the overlap determination unit 72.

The display control unit 71 causes the indicator image sequentially supplied as data by the indicator-superimposed image generating unit 61 to be displayed on the display unit 21 as the live-view image.

The live-view image will be explained herein.

Specifically, the CPU 41 and the like control the image capturing unit 22 so as to continue capturing the image of the subject. While the image capturing unit 22 continues capturing the image of the subject, the CPU 41 and the like operate to temporarily store, in memory (in the present embodiment, the storage unit 49), the data of the captured image (frame) sequentially output from image processing unit 44 via the image capturing unit 22. Such a control processing sequence by the CPU 41 is referred hereinafter as "live-view image capture processing". However, in the present embodiment, the data of the indicator-superimposed image in which the indicator is superimposed on the captured image is output sequentially from the indicator-superimposed image generating unit 61 of the image processing unit 44, and temporarily stored in the memory (in the present embodiment, the storage unit 49).

Furthermore, the display control unit 71 sequentially reads the respective image data temporarily stored in the memory (in the present embodiment, the storage unit 49) in the live-view image capture processing, and sequentially displays, on the display unit 21, the corresponding captured images (frames) (in the present embodiment, the indicator image in which the indicator is superimposed on the captured image). Such a control processing sequence by the display control unit 71 is referred hereinafter to as "live-view image display processing". It should be noted that the captured image displayed on the display unit 21 according to the live-view image display processing (in the present embodiment, the indicator image in which the indicator is superimposed on the captured image) is the "live-view image".

The overlap determination unit 72 determines whether or not a part of the subject image (in the example shown in FIG. 3, the image of the hand h of the user image U) overlaps the indicator image (in the example shown in FIG. 3, the icon image ir) based on the data of the indicator image sequentially supplied from the indicator-superimposed image generating unit 61, and notifies the countdown unit 73 of the determination result.

When the overlap determination unit 72 determines that a part of the subject image overlaps the indicator image, the countdown unit 73 controls the timing unit 47 to start the countdown, and after the countdown ends, notifies the recording control unit 74 accordingly.

This means that the timing unit 47 starts a timing of a predetermined period of time (the period from the start to the end of the countdown) under the control of the countdown unit 73. The countdown unit 73 sequentially compares the time measured by the timing unit 47 with a threshold value corresponding to the predetermined period of time, and when the measured time exceeds the threshold value, the countdown unit 73 notifies the recording control unit 74 that the countdown has ended.

When the recording control unit 74 is notified that the countdown has ended from the countdown unit 73, the recording control unit 74 controls in such a way that the data of the captured image output from the image capturing unit 22 immediately after this notification, more exactly, the data of the captured image on which image process has subsequently been conducted by the image processing unit 44 as appropriate, is recorded as the image data for recording in the removable media 52.

Figure 6:
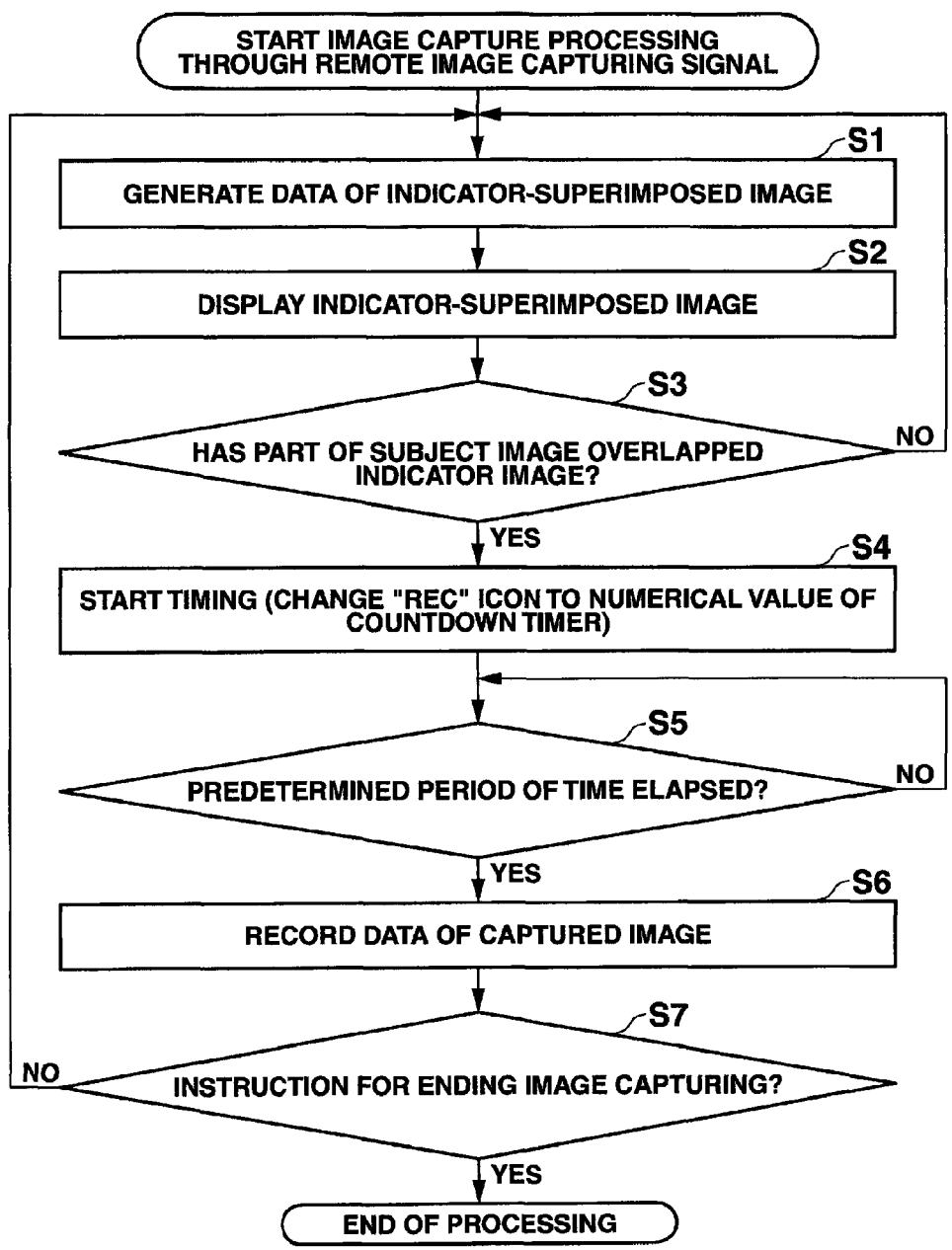
FIG. 6 is a flowchart illustrating the flow of image capture processing through a remote image capturing signal.

Next, referring to FIG. 6, the image capture processing through remote image capturing signal executed by the image capturing apparatus 1 having the functional configuration as shown in FIG. 5 will be explained while referring to FIG. 6. FIG. 6 is a flowchart illustrating the flow of the image capture processing through remote image capturing signal.

In the present embodiment, the image capture processing through remote image capturing signal is commenced when the user performs an operation on the operation unit 48 to turn on the power. More specifically, the following processing is performed.

In Step S1, the indicator-superimposed image generating unit 61 generates the data of the indicator-superimposed image by superimposing image data of the indicator image stored in the indicator storage unit 81 (the icon image it in FIG. 3, or the like) onto the data of the captured image sequentially output from the image capturing unit 22 (for example, the captured image containing the user image U as shown in FIG. 3).

In Step S2, the display control unit 71 displays, on the display unit 21, the indicator-superimposed image thus generated as the data in the processing of Step S1.

In Step S3, the overlap determination unit 72 determines, for the data of the indicator-superimposed image generated in the processing in Step S1 whether or not a part of the subject image (for example, the image of the hand h of the user image U as shown in FIG. 3) has overlapped the indicator image (the icon image ir in FIG. 3, or the like).

For example, if a part of the subject image (for example, the hand image h in the user image U) does not overlap the indicator image (the icon image ir in FIG. 3, or the like) in the indicator-superimposed image, as shown in the indicator-superimposed image P1 of FIG. 3A, a determination of NO is made in Step S3, the processing returns to Step S1, and the processing in Steps S1 to S2 is repeated.

This means that the loop processing of Steps S1 to S3 is repeated until a part of the subject image overlaps the indicator image in the indicator-superimposed image updated sequentially as the live-view image, and the image capture processing through remote image capturing signal enters a standby state.

Subsequently, if a part of the subject image (for example, the image of the hand h of the user image U in FIG. 3) overlaps the indicator (the icon image ir in FIG. 3, or the like) as shown in the indicator-superimposed image P2 of FIG. 3B, for example, a determination of YES is made in Step S3, and the processing proceeds to Step S4.

In Step S4, the countdown unit 73 causes the timing unit 47 to start the timing operation. This means that the countdown operation by the countdown unit 73 is started, and an image is sequentially displayed in which the icon image ir in FIG. 3 is changed to the numerical value of the countdown timer (count showing the remaining seconds or the like).

An image in which the image superimposed on the live-view image is changed from the indicator such as the icon image it to the numerical value of the countdown timer in this way, i.e. the live-view image containing the numerical value of the countdown superimposed, is hereinafter referred to as "timing status display image".

In Step S5, the countdown unit 73 determines whether or not the measured time according to the timing unit 47 has exceeded the predetermined period of time (time preset as the threshold value).

If the measured time has not exceeded the predetermined period of time, a determination of NO is made in Step S5, and the processing returns to Step S5 again. This means that, until the measured time exceeds a predetermined period of time, the determination processing in Step S5 is repeatedly executed and the countdown operation proceeds.

It should be noted the progress during the countdown is informed to the user by displaying the timing status display image on the display unit 21 (not shown). Consequently, since the user informed in this manner can easily recognize the remaining time until the countdown ends, the user can suitably prepare a pose, for example.

Subsequently, when the measured time exceeds the predetermined period of time, a determination of YES is made in Step S5, the completion of the countdown is informed from the countdown unit 73 to the recording control unit 74, and the processing proceeds to Step S6.

In Step S6, the recording control unit 74 causes the data of the captured image output from the image capturing unit 22 immediately after this notification, more exactly, the data of the captured image on which image process has subsequently been conducted by the image processing unit 44 as appropriate, to be recorded as the image data for recording in the removable media 52.

In Step S7, the recording control unit 74 determines whether or not there has been an instruction for ending image capturing.

If there has not been an instruction for ending image capturing, a determination of NO is made in Step S7, and the processing returns to Step S1. This means that the processing in Steps S1 to S7 is repeatedly performed until there is an instruction for ending image capturing.

By configuring in this way, until the user has made an instruction for ending image capturing, the user can have the data of an image captured at the desired shutter timing recorded any number of times by repeating a hand gesture operation such as holding a hand over the indicator.

Subsequently, for example, when the user has made the instruction for ending image capturing by performing a predetermined operation on the operation unit 48 and gives the operation unit 48 the instruction to end the image capturing, a determination of YES is made in Step S7, and the image capture processing through remote image capturing signal ends.

As explained in the foregoing, the image capturing apparatus 1 of the present embodiment includes the display unit 21, the image capturing unit 22, the display control unit 71, the overlap determination unit 72, and the recording control unit 74.

The display control unit 71 controls in such a way that the indicator-superimposed image acquired by superimposing the image of the subject image sequentially captured by the image capturing unit 22 and the indicator image indicative of an instruction for recording (for example, the icon image it in FIG. 3) is displayed on the display unit 21.

The overlap determination unit 72 determines whether or not a part of the subject image (for example, the image of the hand h of the user image U in FIG. 3) has overlapped the indicator image superimposedly displayed on the captured image.

When the overlap determination unit 72 determines that the image of the part of the subject has overlapped the indicator, the recording control unit 74 causes the data of a captured image of the subject captured by the image capturing unit 22 to be recorded in a predetermined storage media (for example, although it is the removable media 52 in the aforementioned example, it may be other storage media built into the image capturing apparatus 1, such as the storage unit 41).

In this case, the user, i.e. the subject, can easily give an instruction for image capturing for recording at a shutter timing intended by the user, by simply making a hand gesture operation such that a part of the user (a hand or the like) is held over the indicator, without any dedicated apparatus for designating the shutter timing.

Furthermore, the image capturing apparatus 1 of the present embodiment further includes: a timing unit 47 that starts a timing under the control of the countdown unit 73, when the overlap determination unit determines that the image of the part of the subject has overlapped the indicator; and the countdown unit 73 that determines whether or not the measured time according to the timing unit 47 exceeds a predetermined threshold (the predetermined period of time described in Step S5 of FIG. 6).

Consequently, after the overlapping determination unit 72 determines that the image of the part of the subject has overlapped the indicator, the recording control unit 74 causes the data of a captured image of the subject to be recorded in the predetermined storage media when the countdown unit 73 determines that measured time has exceeded a predetermined threshold time (countdown has ended).

The data of a captured image of the user is thereby recorded not for the moment at which a hand gesture operation such as holding a part (a hand or the like) of the user, i.e. the subject, over the indicator was made, but rather for a moment after a subsequent predetermined period of time had elapsed (countdown had ended).

Therefore, since the user can carry out preparations for a pose or the like during the time from when the user made a hand gesture operation until the predetermined period of time has elapsed, a captured image that is captured under the ideal conditions for the user will be obtained.

It should be noted that the present invention is not limited to the embodiment described above, and any modifications and improvements thereto within the scope that can realize the object of the present invention are included in the present invention.

For example, although the indicator superimposed on the captured image is the icon image it (FIG. 3) indicative of an instruction to capture an image in the embodiment described above, the present invention is not limited thereto. More specifically, various types of GUI (Graphical User Interface) necessary for the image capturing operation or the like can be employed as an indicator. Furthermore, it is possible to arrange a plurality of indicator images at any position of a captured image, so long as a part of the subject image (a hand of the user, or the like) does not overlap more than one indicator image.

For example, such a GUI can include, besides an icon for an instruction for recording (self-timer) as in the present embodiment, various types of GUI such as a UI capable of adjusting luminance and ISO (International Organization for Standardization) speed, a movie button (software button) and the like.

In the context of the invention, the UI capable of adjusting luminance and ISO is not necessarily an icon or a software button, but may be a slider, for example.

Slider refers to a software control mimicking a function of a slide potentiometer found in audio equipment. Generally, the slider is configured by a display mimicking both a small knob and a channel along which the knob is slid.

The slider has a function of selecting one value within a specified range. Among the two ends of the channel, one end corresponds to a minimum value, and the other end corresponds to a maximum value. Thus, the user, i.e. the subject, can select any value (desired values of the luminance or the ISO sensitivity, or the like) associated within the range of the channel, by a hand gesture operation of waving his/her hand to the right and left, and dragging the display of the small knob to move within the display of the channel on the indicator-superimposed image.

It should be noted that when focusing only on the function of selecting one option among several options, a radio button or a list box can be employed; however, the use of the slider enables the user to select any desired value from a set of consecutive values.

Furthermore, although the image capturing apparatus 1 such as a digital camera has been explained in the aforementioned embodiment as an example of the electronic apparatus to which the present invention is applied, the present invention is not particularly limited thereto. The present invention can generally be applied to any electronic device having an image capturing function and a display function. More specifically, for example, the present invention can be applied to a laptop personal computer, a video camera, a portable navigation device, a cell phone device, a portable game device, a web camera, and the like.

The processing sequence described above can be executed by hardware, and also can be executed by software. In other words, the hardware configuration shown in FIG. 5 is merely an illustrative example, and the present invention is not particularly limited thereto. More specifically, the types of functional blocks employed to realize the above-described functions are not particularly limited to the example of FIG. 5, so long as the image capturing apparatus 1 can be provided with the functions enabling the aforementioned processing sequence to be executed in its entirety. A single functional block may be configured by a single piece of hardware, a single installation of software, or any combination thereof.

In a case in which the processing sequence is to be executed by software, a program configuring the software is installed from a network or a storage medium into a computer or the like. The computer may be a computer embedded in dedicated hardware. Alternatively, the computer may be a computer capable of executing various functions by installing various programs, e.g., a general-purpose personal computer.

The storage medium containing such a program can not only be constituted by the removable media 52 shown in FIG. 4 distributed separately from the device main body for supplying the program to a user, but also can be constituted by a storage medium or the like supplied to the user in a state incorporated in the device main body in advance. The removable media 52 is composed of a magnetic disk (including a floppy disk), an optical disk, a magnetic optical disk, or the like, for example. The optical disk is composed of a CD-ROM (Compact Disk-Read Only Memory), a DVD (Digital Versatile Disk), or the like, for example. The magnetic optical disk is composed of an MD (Mini-Disk) or the like. The storage medium supplied to the user in a state incorporated in the device main body in advance may include the ROM 42 shown in FIG. 4, a hard disk (not shown) or the like in which the program is recorded, for example.

It should be noted that, in the present specification, the steps describing the program recorded in the storage medium include not only the processing executed in a time series following this order, but also processing executed in parallel or individually, which is not necessarily executed in a time series.

What is claimed is:

1. An image capturing apparatus, comprising:
   an image capturing unit that sequentially captures images containing a subject image;
   a display control unit that controls a display unit to display (i) images corresponding to the sequentially captured images and containing the subject image and (ii) a first indicator image for instructing recording of the subject image such that the first indicator image is superimposed on the displayed images;
   an overlap determination unit that determines whether the first indicator image and the subject image have overlapped;
   a notification unit that notifies a user of a remaining time before recording an image containing the subject image by controlling the display unit to change an entirety of the first indicator image to a second indicator image indicating the remaining time, when the overlap determination unit determines that the first indicator image and the subject image have overlapped; and
   a recording control unit that performs control to record the image containing the subject image to be recorded in a storage medium, after the remaining time has elapsed.

2. The image capturing apparatus according to claim 1, further comprising:
- a timing unit that starts timing when the overlap determination unit determines that the first indicator image and the subject image have overlapped; and
- a time determination unit that determines whether a measured time according to the timing unit has exceeded a predetermined time,
- wherein, after the overlap determination unit has determined that the first indicator image and the subject image have overlapped, the recording control unit performs control to record the image containing the subject image in the storage medium when the time determination unit has determined that the measured time has exceeded the predetermined time.

3. The image capturing apparatus according to claim 1, wherein the subject image comprises an image of a person captured by the image capturing unit.

4. The image capturing apparatus according to claim 1, wherein the notification unit controls the display unit to display a countdown image as the second indicator image.

5. The image capturing apparatus according to claim 1, wherein:
- an orientation of the capturing by the image capturing unit and an orientation of the displaying by the display unit are substantially coincident with each other; and
- the display control unit controls the display unit to display mirror images of the sequentially captured images.

6. The image capturing apparatus according to claim 1, wherein the notification unit controls the display unit to change the first indicator image to the second indicator image at a same position as the first indicator image.

7. An image capturing control method executed by an image capturing apparatus, the image capturing apparatus having an image capturing unit that sequentially captures images containing a subject image, and the method comprising:
- controlling a display unit to display (i) images corresponding to the sequentially captured images and containing the subject image and (ii) an indicator image for instructing recording of the subject image such that the indicator image is superimposed on the displayed images;
- determining whether the indicator image and the subject image have overlapped;
- notifying a user of a remaining time before recording an image containing the subject image by controlling the display unit to change an entirety of the first indicator image to a second indicator image indicating the remaining time, when it is determined that the indicator image and the subject image have overlapped; and
- performing control to record the image containing the subject image in a storage medium, after the remaining time has elapsed.

8. A non-transitory computer readable storage medium having a program stored thereon which is executable by a computer of an electronic apparatus, the electronic apparatus comprising (i) an image capturing unit that sequentially captures images containing a subject image, and (ii) a storage medium, and the program being executable to control the computer to function as units comprising:
- a display control unit that controls a display unit to display (i) images corresponding to the sequentially captured images and containing the subject image and (ii) an indicator image for instructing recording of the subject image such that the indicator image is superimposed on the displayed images;
- an overlap determination unit that determines whether the indicator image and the subject image have overlapped;
- a notification unit that notifies a user of a remaining time before recording an image containing the subject image by controlling the display unit to change an entirety of the first indicator image to a second indicator image indicating the remaining time, when the overlap determination unit determines that the indicator image and the subject image have overlapped; and
- a recording control unit that performs control to record the image containing the subject image to be recorded in a storage medium, after the remaining time has elapsed.

* * * * *